US007425962B2

United States Patent
Alcorn et al.

(10) Patent No.: US 7,425,962 B2
(45) Date of Patent: Sep. 16, 2008

(54) SYSTEMS AND METHODS FOR GENERATING A COMPOSITE VIDEO SIGNAL FROM A PLURALITY OF INDEPENDENT VIDEO SIGNALS

(75) Inventors: Byron Alan Alcorn, Fort Collins, CO (US); Donley Byron Hoffman, Fort Collins, CO (US); Jeffrey Joel Walls, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 652 days.

(21) Appl. No.: 10/899,961

(22) Filed: Jul. 27, 2004

(65) Prior Publication Data

US 2006/0022973 A1 Feb. 2, 2006

(51) Int. Cl.
*G09G 5/36* (2006.01)
*G09G 5/399* (2006.01)
*G06F 15/16* (2006.01)

(52) U.S. Cl. ..................... 345/556; 345/539; 345/502
(58) Field of Classification Search ............... 345/418, 345/419, 501, 502, 530, 531, 536, 537, 539, 345/545, 547, 556
See application file for complete search history.

(56) References Cited

U.S. PATENT DOCUMENTS

| | | | | |
|---|---|---|---|---|
| 5,309,235 A | * | 5/1994 | Naimpally | 348/476 |
| 5,592,236 A | * | 1/1997 | Rosenbaum et al. | 348/586 |
| 6,157,395 A | * | 12/2000 | Alcorn | 345/506 |
| 6,249,294 B1 | * | 6/2001 | Lefebvre et al. | 345/504 |
| 6,317,166 B1 | | 11/2001 | McCutchen | |
| 6,348,933 B1 | | 2/2002 | Walls et al. | |
| 6,385,267 B1 | | 5/2002 | Bowen et al. | |
| 6,392,707 B1 | | 5/2002 | Cooper et al. | |
| 6,441,812 B1 | | 8/2002 | Voltz | |
| 6,606,127 B1 | | 8/2003 | Fang et al. | |
| 6,636,269 B1 | * | 10/2003 | Baldwin | 348/500 |
| 6,642,968 B1 | | 11/2003 | Ford et al. | |
| 7,034,837 B2 | * | 4/2006 | Sadowski et al. | 345/506 |
| 7,274,370 B2 | * | 9/2007 | Paquette | 345/536 |
| 2002/0033828 A1 | | 3/2002 | Deering et al. | |
| 2003/0142037 A1 | | 7/2003 | Pinedo et al. | |
| 2004/0012578 A1 | | 1/2004 | Naegle | |
| 2004/0075745 A1 | | 4/2004 | Mance et al. | |
| 2005/0195206 A1 | * | 9/2005 | Wogsberg | 345/547 |

OTHER PUBLICATIONS

"Delivering the DVI Digital Interface to the CRT Monitor," by Silicon Images, Inc, White Paper, Feb. 2000, pp. 1-11.
"DVI and HDMI-Digital A/V Interfaces for a New Age," by Alen Koebel, Wide Screen Review, Issue 69, Date Unknown, pp. 1-5.
"Understanding Digital Video Interface (DVI) Compliance Testing," by Techtronix, www.techtronix.com./oscillloscopes, Data Unknown, pp. 1-8.

* cited by examiner

Primary Examiner—Kee M. Tung
Assistant Examiner—Joni Hsu

(57) ABSTRACT

Illustrated and described embodiments are broadly directed to novel systems and methods for generating a composite video signal from a plurality of independent video signals. In accordance with one embodiment, a method is provided for swapping from a secondary frame buffer of one of the plurality of computers. This synchnonization is performed by embedding a validity code having a first value in an overscan line of the video signal before beginning the swap and embedding a validity code having a second in the overscan line of the video signal after the swap is complete.

22 Claims, 8 Drawing Sheets

SYSTEMS AND METHODS FOR GENERATING A COMPOSITE VIDEO SIGNAL FROM A PLURALITY OF INDEPENDENT VIDEO SIGNALS

BACKGROUND OF THE INVENTION

1. Field of the Invention

The present invention relates to computer systems and, more particularly, to novel systems and methods for generating a composite video signal from a plurality of independent video signals.

2. Discussion of the Related Art

The rendering of three-dimensional computer graphics is a computationally intensive process. In many high-end applications, three-dimensional computer graphics are rendered using a pool or cluster of computers, which share the processing responsibilities. In such a system, one computer may be configured to execute at least one application program and communicate graphics data to other computers for rendering. In this regard, a collection of computers may be configured to cooperatively render a graphics image and may receive the graphics data to be rendered from the computer executing the application program.

When multiple computers are used to render a single scene, the video signals generated by each of those computers are combined into a single aggregate (or composite) signal and encoded in a particular format, such as NTSC, PAL, etc. There exist devices called compositors that perform the function of combining (or compositing) multiple video signals into a single, composite video signal. Accordingly, there are known approaches for performing the functions of a compositor. One function that is performed by a compositor is the synchronizing of the multiple input video signals. On computers having high-end graphics cards, a genlock is often provided and used to perform this function. As is known, a genlock is a synchronization mechanism or technique that effectively eliminates independent time bases of various computer graphics systems, by using a phase-locked loop (PLL).

However, many graphics cards do not include a genlock mechanism. In such systems, other mechanisms are needed if multiple video signals are to be synchronized for compositing. One approach has been to provide sufficient memory within the compositor to triple-buffer the data received at each video input. Since there may be relatively disparate amounts of graphic data output from each of the individual computers that are rendering the graphic scene, for any given frame, a frame's worth of data may be output much more quickly from one of the computers than from others of the computers. Typically, triple-buffering this data has been found to provide sufficient buffering to prevent a loss of synchronization among the plurality of computers.

However, triple-buffering requires excessive memory and results in additional latency, due in part to the time required to read frames of data into the three buffers.

SUMMARY

Accordingly, embodiments of the present invention are broadly directed to novel systems and methods for generating a composite video signal from a plurality of independent video signals. In accordance with one embodiment, a method is provided for swapping from a secondary frame buffer of one of the plurality of computers. This synchronization is performed by embedding a validity code having a first value in an overscan line of the video signal before beginning the swap and embedding a validity code having a second value in the overscan line of the video signal after the swap is complete.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

Figure 1:
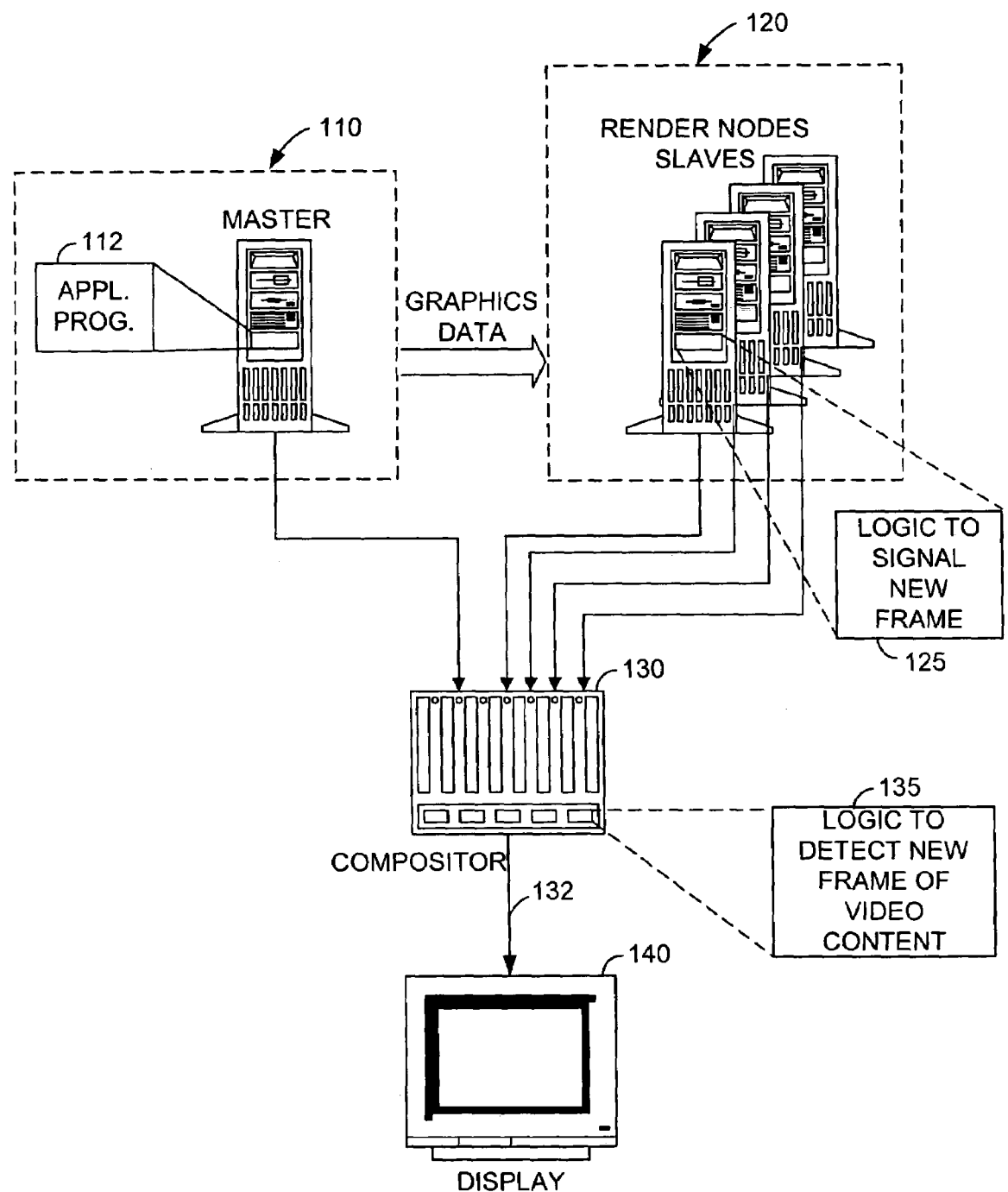
FIG. 1 is a diagram illustrating a computing environment of one embodiment of the present invention.

Reference is now made to the drawings, in which FIG. 1 illustrates a computing environment in which one embodiment of the present invention resides and operates. Many high-end or intensive graphic programs are executed, and graphics images are rendered, using a plurality of computers in combination. There are various ways in which multiple computers are configured to operate either in parallel or in conjunction to perform a graphics-rendering task. One way is to configure one computer 110 to operate as a master, and configure the remaining plurality of computers 120 to operate as slaves. In the illustrated embodiment, the slave computers 120 are configured to collectively render a three-dimensional graphics image. The rendering among the slave computers 120 are partitioned in a variety of ways. One way is to partition the screen space into various partitions and have each slave computer render the data associated with its partition. Another way is to partition the graphics data into layers and have each slave 120 render one or more layers.

In the embodiment illustrated in FIG. 1, the master computer 110 executes an application program 112 that involves the rendering of three-dimensional graphics. The control and functionality of the application program 112 is handled by the master computer 110. As well, the master computer 110 is handled various two dimensional graphics rendering that is incidental to the execution of the application program 112. For example, the presentation of drop-down menus or other items of presentation that do not require three-dimensional rendering is performed by the master computer 110. Each of the computers (master computer 110 and each of the slave computers 120) includes a graphics card (or other graphics circuitry) that outputs a signal for a video display 140. Since, however, the content that is rendered by each of the computers must first be combined, the video outputs of each of the computers are delivered to a compositor 130. A compositor 130 operates to combine the content of each of the plurality of input video signals to deliver a single, composite output signal 132 that is used to drive a display device 140.

Consistent with the scope and spirit of the embodiments described herein, an alternative environment includes multiple displays 140 that are configured to operate as a single logical display. There are a variety of applications in which graphics information is presented over a panel or matrix of displays, to effectively emulate a single, large display. Examples of such systems include: real estate, financial (such as the stock market), control room, large engineering processes, military mapping, telecommunications, etc. Such systems require the output of large amounts of data, which can easily exceed the viewable display capacity of a single, physical monitor (a user could view relevant data only by panning and zooming). The implementation and management of such systems emulating a single display through multiple displays is well known and need not be described herein.

In a system environment such as that of FIG. 1, the computer 110 executing the graphics application program communicates to the cluster of render nodes 120 the relevant data utilized for carrying out the rendering operations. The structure and content of such data will be known and appreciated by persons skilled in the art, as it is the underlying data specifying primitives, texture, lighting, shading, and other aspects employed for rendering a given graphics image. In one embodiment, such information is communicated by the master 110 to the individual slave computers as appropriate, based upon the partitioned operation of the slave units. In other embodiments, the data is communicated to a defined slave computer that is running a process or program that would further subdivide and allocate the underlying graphics information to individual slave nodes for processing.

It should be appreciated that each slave 120 operates substantially independent from the other slave computers, insofar as the graphics information output from the video outputs of each is not synchronized (from a timing standpoint) with the other render nodes. In accordance with one embodiment, a novel system and method are provided for efficiently synchronizing the video signals input to the compositor 130. This is accomplished by identifying new frames of video or graphics information communicated from the render nodes 120 to the compositor 130. To achieve this, logic 125 is provided within each of the render nodes 120 for modifying the content or signaling within a frame of reference information communicated to the compositor, so as to identify the communication of a new frame of graphics information. The video signal typically output from a graphics card continually and repeatedly communicates the information that is to be displayed on a display. If the display is static (e.g., no changing graphic information) for a series of frames, the video signal output from the graphics card will nonetheless repeatedly output the same information for each frame. In one embodiment, the render nodes 120 include graphics cards that output video signals in accordance with the digital video interface (DVI) specification.

As is known, the DVI specification defines a high-speed digital interface. TMDS takes the signal from the graphics adapter, determines the resolution and refresh rate that the monitor is using and spreads the signal out over the available bandwidth to optimize the data transfer from computer to monitor. DVI is technology-independent; this enables video or graphic data output over DVI to properly perform with wide variety of displays and graphics cards.

In keeping with the description of FIG. 1, the logic 125, in one embodiment, incorporates information into the DVI data stream so as to signal the new frame of information (e.g., a frame having content that may differ from the previous frame) in a location of the video stream that is outside the viewable area. As will be described further herein, in one embodiment, this entails imbedding signaling or codes into a defined overscan area.

Correspondingly, the compositor 130 includes logic 135 to detect a new frame of information that is being communicated. In one embodiment, this logic 135 is provided for each of the plurality of video inputs that are provided to the compositor 130. In operation, upon detecting the signaling indicating a new frame of video or graphics information, the logic 135 captures the data or content associated with that new frame of information. Advantageously, the signaling provided by this embodiment reduces the amount of memory required at the compositor as it makes identification of new video frames accurate and precise. Once the new frame of video information has been identified and captured for each of the plurality of inputs, a single, composite frame of information is compiled for that new frame of information, and output to the display 140. It should be appreciated that, consistent with the structure and methodology summarized above, a variety of particular implementations is realized, in accordance with the scope and spirit of the embodiments described herein.

Figure 2:
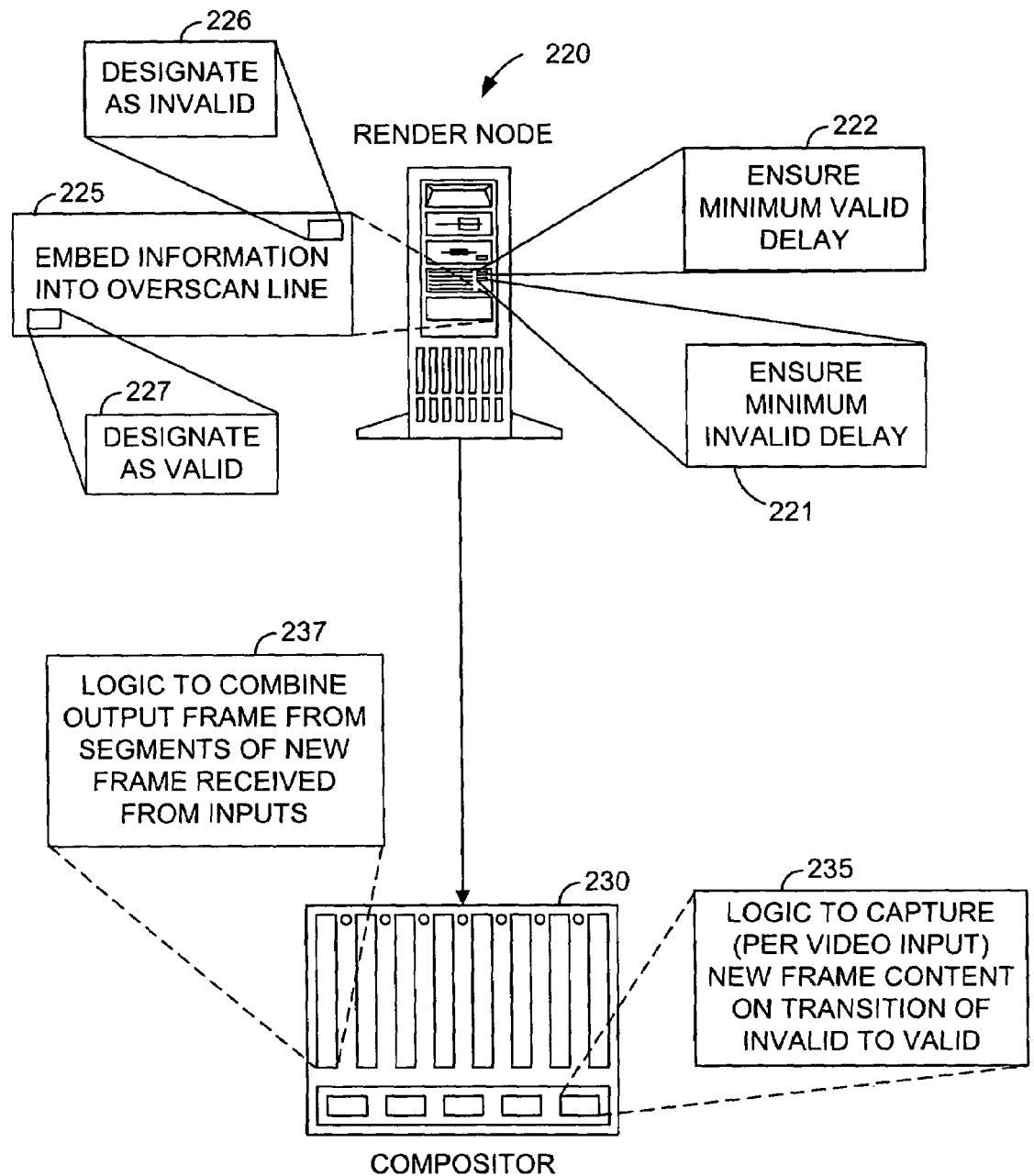
FIG. 2 is a diagram illustrating certain components of one embodiment of the present invention.

Reference is now made to FIG. 2, which is a diagram illustrating certain elements of one embodiment of the present invention. Shown in FIG. 2 is a single render node 220 and compositor 230. The master node and additional render nodes illustrated in FIG. 1 are omitted from FIG. 2 for simplicity, but it should be appreciated that additional render nodes, similar to the one illustrated in FIG. 2, is provided. Logic 225 is provided within each render node 220 that is configured to embed information into an overscan line of the video output. In accordance with this embodiment, the logic 225 further comprises logic 226 and 227 for providing or modifying a code that is inserted in the overscan line or designating the current frame of graphics information as either valid or invalid. There are a variety of ways that the graphics logic within the render node 220 is configured to provide information in an overscan line of the video output. A discussion is provided herein, in connection with FIG. 7, that summarizes one manner in which a render node may be so configured. Consistent with the scope and spirit of the embodiments described herein, additional methods or mechanisms for configuring this operation of the render node 220 may be implemented.

Frames of graphics information are designated as invalid during a period of time in which a render node is swapping a secondary or back buffer of a frame buffer into the front buffer area for output to the compositor. Double-buffering of frame buffer information in this manner is known and need not be described herein. In short, the render nodes are configured to render a frame of graphics information into a back or secondary buffer. Thereafter, once the data is fully rendered into the secondary buffer, the two buffers are swapped, such that the newly-rendered information is output to a video display (or in this embodiment, the compositor). In operation, the master computer communicates graphics data to each of the plurality of render nodes. As each, individual render node completes the rendering of its portion of that frame of graphics information, it so communicates such completion via a signaling mechanism back to the master computer. Once the master computer has confirmed that each of the plurality of render nodes has rendered its portion of the current frame of graphics information, then the master computer signals to each of the render nodes to perform a swap of its secondary or back frame buffer. This signaling may be performed via a multicast message sent via IP (Internet Protocol) to the plurality of render nodes (of course, other approaches and methodologies may be implemented as well).

The render node 220 also includes logic 221 for ensuring that a minimum time period elapses in which the graphics data is designated as invalid. Likewise, the render node 220 includes logic 222 for ensuring that a minimum time delay is guaranteed during which the output graphics data is designated as valid. These logic elements 221 and 222 include timers or other mechanisms for providing this functionality. By way of further explanation, for any given frame of graphics information, the content provided by any given render node is very small in comparison to the content provided by other render nodes. As described above, in one embodiment, a graphics scene is partitioned into a plurality of partitions, with each partition being rendered by a separate render node. For any given graphics scene or graphics frame, the content rendered by any given render node could be very small. In order to provide effective synchronization in the communication among the various render nodes and the compositor of one embodiment, each render node is configured to designate an output as invalid for a given minimum period of time, so as to ensure that the compositor receives this invalid code for each of the plurality of render nodes, before identifying and receiving the valid code and content for new frames of graphics information. Likewise, in an embodiment, each render node is configured to output graphics data of a valid frame for a minimum period of time, so as to ensure that each channel of the compositor 230 identifies and receives the valid graphics frame for each of the plurality of render nodes.

In operation, once each render node receives the signaling command from the master computer to perform a back buffer swap, each of the render nodes 220 just prior to initiating the swap) embeds information into an overscan line that the graphics data is invalid. Thereafter, the back buffer swap is performed, and once the back buffer swap is complete, each render node will acknowledge to the master computer that the swap is complete. Once the master computer has received this acknowledgment from each of the render nodes, it then responds to all render nodes to signal the render nodes to now designate their outputs (in the overscan line) as valid. Upon ensuring that a minimum swap (or invalid) time period has passed, the render nodes will embed a code in their overscan lines, indicating that the output is again valid.

Turning now to the compositor 230, in this embodiment, the compositor comprises logic 235 to capture, on a per-video input basis, new frame content for each new frame of graphics information. In this regard, the logic 235 identifies, for each video input, a designation that the associated video content is invalid. Thereafter, the logic 235 monitors, for each video input, the overscan line associated with that frame of graphics information for a designation that the frame of information is valid. Upon detecting the invalid to valid transition of each graphics input, the compositor then captures the associated content or graphics data associated with the newly-valid frame.

The compositor 230 further comprises logic 237 to combine the plurality of captured graphics frames for each video input, once the new frame of information has been received for each. Once the logic 237 combines the individual frames of information into a composite frame, this composite frame is output in the form of a video signal to drive a display (see FIG. 1).

Figure 3:
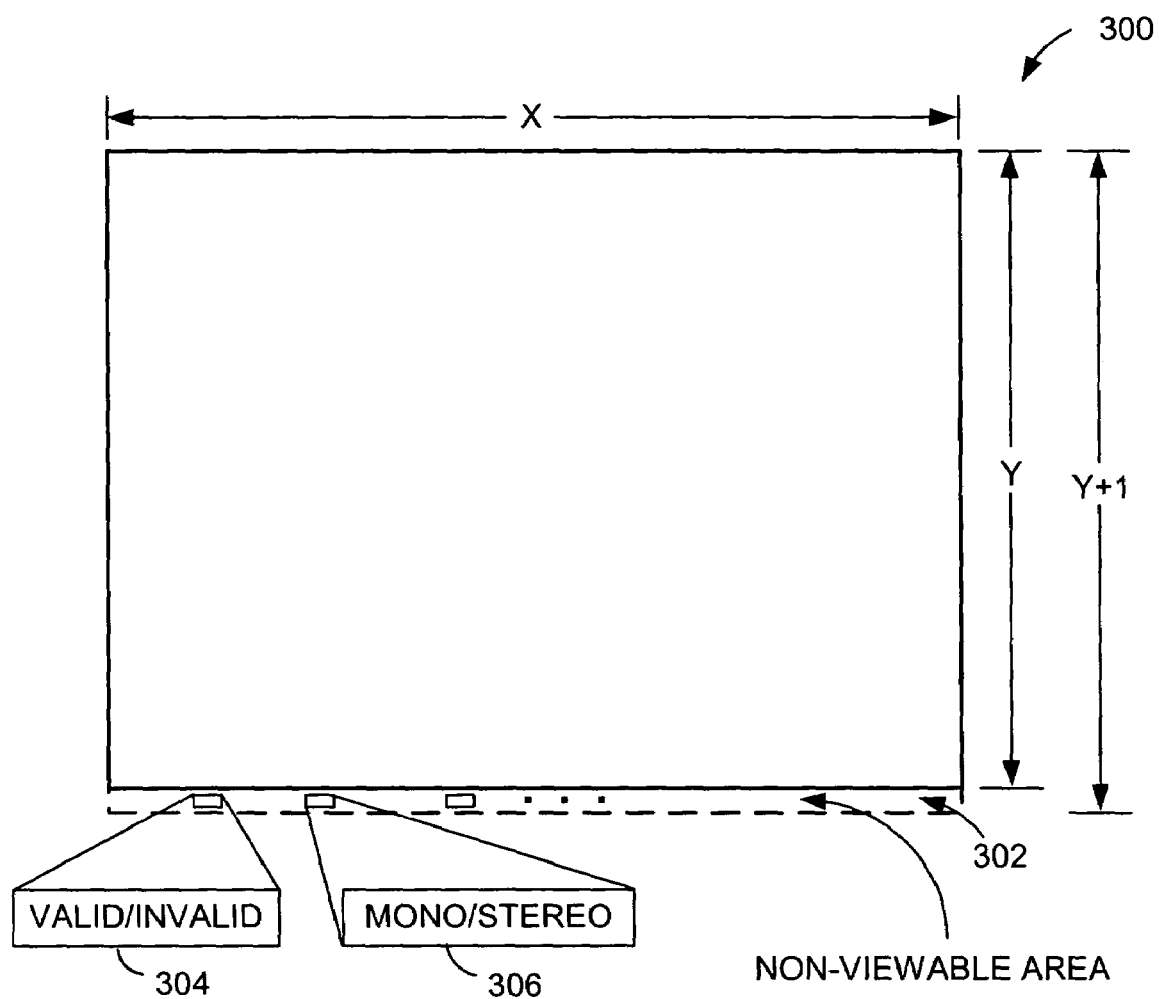
FIG. 3 is a diagram illustrating an overscan line in a display, in which certain information is embedded in accordance with an embodiment of the present invention.

Reference is now made to FIG. 3, which is a diagram illustrating an overscan area with reference to a viewable area of a graphics display. Specifically, FIG. 3 illustrates the viewable area of a display 300 having a viewable display area of X pixels wide and Y pixels high. In accordance with an embodiment described herein, an additional scan line 302 is provided, wherein this additional scan line is a non-viewable area. Accordingly, in such an embodiment, data is encoded for communication over the DVI (or other display interface). In accordance with an embodiment, data is embedded within the overscan line 302, which data communicates information from the render nodes to the compositor. In one embodiment, data 304 is encoded to indicate whether the associated frame of graphics information is valid or invalid. As described above, during the time that render nodes perform a back buffer swap, the associated display information is denoted as invalid. In another embodiment, data within the overscan area 302 indicates whether the current graphics data is operating in mono or stereo mode 306. As is known, stereo mode is a mode in which two frames of graphics data are provided for every frame of graphic content information (one frame to be viewable by a left eye and one to be viewable by a right eye). Stereo modes of operation are well known and understood by persons skilled in the art. It will be appreciated that the concepts and teachings of the embodiments described herein are equally applicable to both mono and stereo modes of operation. It will be further appreciated that minor implementation details may vary between the two modes, such as providing a longer minimum period for denoting a frame as valid in order to capture graphics data operating in a stereo mode, as opposed to a mono mode (to allow sufficient time for the capture of both left eye and right eye frames of information).

Figure 4:
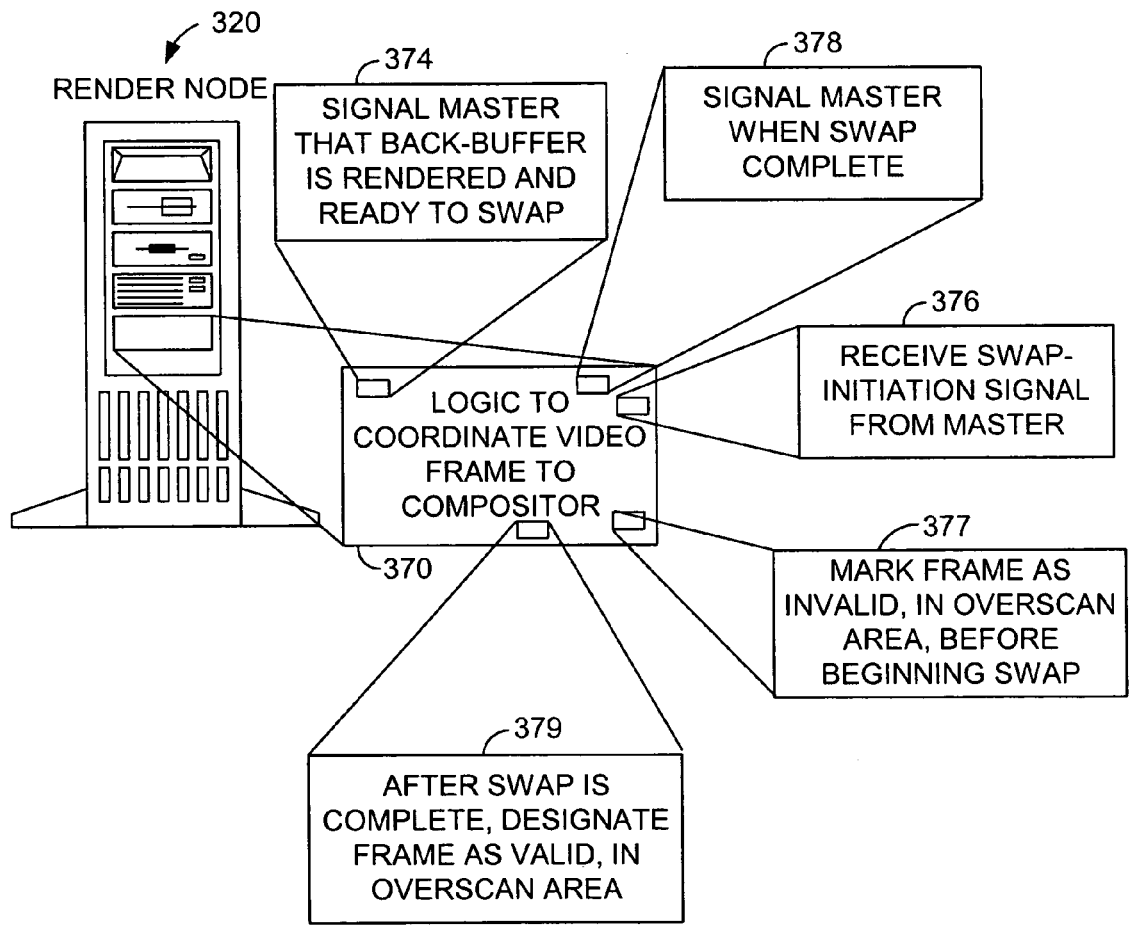
FIG. 4 is a diagram illustrating certain components of a render node constructed in accordance with one embodiment of the present invention.

Reference is now made to FIG. 4, which is a diagram illustrating certain logic components or mechanisms implemented in each of the render nodes 320 of an embodiment of the present invention. As described above, one feature of various embodiments relates to the synchronization of a new frame or video information from a render node to a compositor. Accordingly, a render node 320 of the embodiment of FIG. 4 comprises logic 370 for synchronizing the communication of a new video frame of graphics information to a compositor. Logic 370 includes logic 374 that communicates or signals to a master computer that the most recently received graphics data from the master computer has been rendered into the back buffer and that frame of graphics information is ready to be swapped into the front (primary) buffer for communication to the compositor. In one embodiment, the master computer waits for all render nodes to provide such an indication that their back buffers have been rendered and all are ready to swap into their respective front buffers. Once the master has received this indication from all render nodes, the master signals the render nodes to perform the back buffer swap. Accordingly, the render node 320 includes logic 376 for receiving a swap-initiation signal from the master. The logic 370 further includes logic 377 to mark a current frame as invalid (in an overscan area) before beginning the back buffer swap. The render node 320 then performs the back buffer swap, and this operation is performed in accordance with mechanisms and methodologies known in the art.

The logic 370 further includes logic 378 to signal the master computer that the swap is complete. In one embodiment, the master computer uses this acknowledgement or signal from the render nodes to coordinate the communication of future graphics information to be rendered. Finally, the logic 370 includes logic 379 to designate the frame of graphics data being output over the DVI (or other interface) as valid. As previously described, this designation is made by a unique valid code embedded in an overscan area of the graphics frame.

Figure 5:
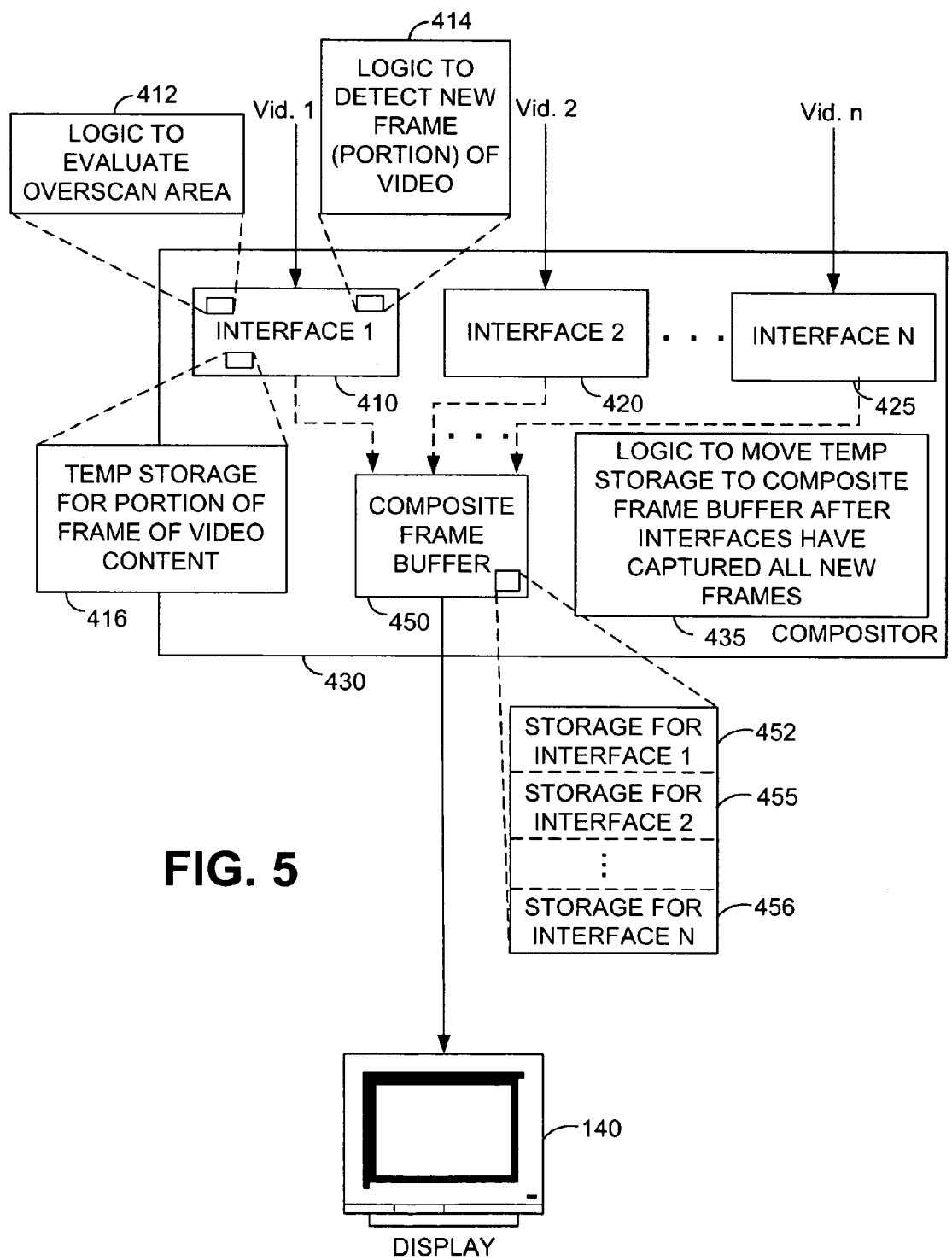
FIG. 5 is a diagram illustrating certain components of a compositor constructed in accordance with one embodiment of the present invention.

Reference is now made to FIG. 5, which is a diagram illustrating certain components and features of a compositor 430 constructed in accordance with one embodiment of the invention. As described above, the compositor 430 includes inputs for receiving a plurality of video signals (vid1, vid2 . . . vidn) that are output from graphics cards of the plurality of render nodes. In this embodiment, the compositor 430 includes a plurality of interfaces (410, 420 and 425), wherein each of the individual interfaces is configured to receive one of the plurality of input video signals. In the illustrated embodiment, each interface is similarly constructed, and therefore components of only one interface will be described herein, as it will be understood that the remaining interfaces include similar components.

With reference to interface 410, the interface 410 includes logic 412 that is configured to evaluate an overscan area of a given, incoming frame of graphics information. As described hereinabove, various information is embedded into this overscan area. One such item of information is an indication as to whether the current frame of graphics information is valid or invalid. Accordingly, logic 412 evaluates the overscan area to retrieve this portion of information. The interface 410 also includes logic 414 that is configured to detect a new frame (or a portion thereof) of graphics information. In one embodiment, logic 414 operates in conjunction with logic 412, such that logic 414 identifies a new frame by identifying a transition of the validity code from invalid to valid. Such a transition indicates that the back buffer of the associated render node has been swapped and new data is now being communicated over the DVI (or other interface).

The interface 410 further includes a memory area 416 to provide temporary storage for the frame (or a portion thereof) of graphics information newly received over the video signal interface. In an embodiment in which the interface is a DVI interface, the digital content is readily obtained from the video signal and stored directly into a memory storage space.

The compositor 430 further includes logic 435 that is configured to move the various graphics information stored in the temporary storage area of the various interfaces 410, 420, and 425 into a composite frame buffer 450. In this respect, the logic 435 preferably communicates with each of the interfaces 410, 420 and 425 to ascertain when each interface has received (and stored into its temporary storage space) a new frame of graphics information. Once this has occurred, then the various temporary storage space is communicated to their respective locations (e.g., 452, 454 . . . 456) of the composite frame buffer 450. The information in this frame buffer is used to generate a video signal an output to a display 140, in a manner that is known and understood in a person skilled in the art.

It will be appreciated that the embodiment of the compositor illustrated in FIG. 5 is one example of a number of potential embodiments or implementations that is provided in accordance with the scope and spirit of the embodiments described herein.

Figure 6:
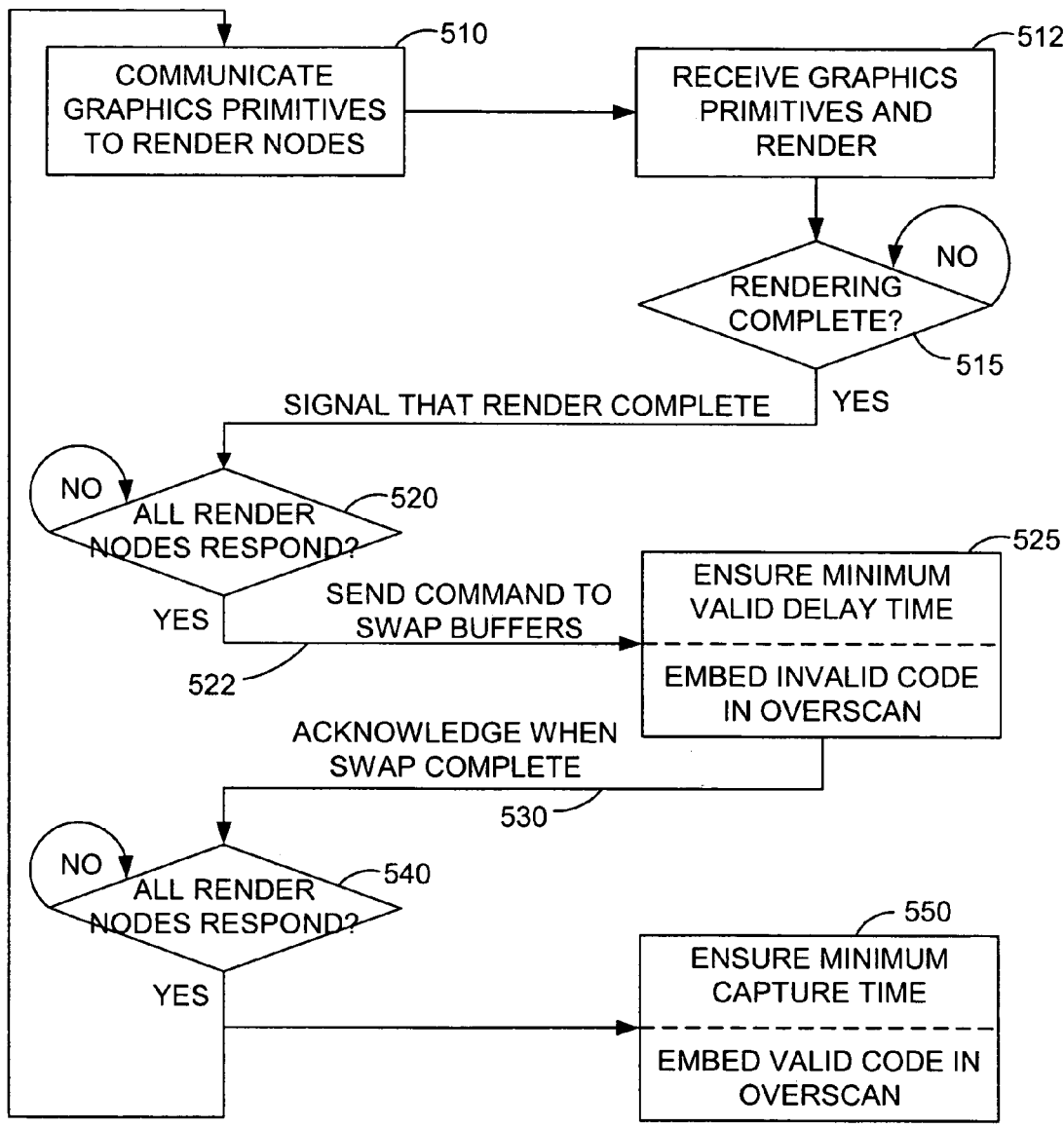
FIG. 6 is a flowchart illustrating certain operations performed at a master node and a render node, in accordance with an embodiment of the present invention.

Having described various components of certain embodiments of the present invention, reference is now made to FIG. 6, which is a flowchart illustrating the top-level operation of an embodiment of the present invention, comprising basic communication between the master and a render node. In the illustrated embodiment, the process begins with the master computer communicating graphics primitives to the various render nodes to be rendered into their frame buffers (510). Accordingly, the respective render nodes receive the graphics primitives communicated from the master and render them into their secondary or back frame buffer (512). Once the render node completes the rendering of the information provided by the master, the render node then signals to the master that the render is complete (515). The master computer waits to receive this indication from each of the plurality of render nodes—that all have completed their respective rendering (520). Upon receiving this notification from all render nodes, the master computer instructs the render nodes to perform a back buffer swap (522). In response to receiving this instruction, each render node checks to see if the minimum valid time has been reached, then embeds a code into an overscan area to indicate that the associated frame is invalid. In one embodiment, each render node uses a timing mechanism (e.g., a timer) to provide or ensure a prescribed at a minimum delay before the associated frame of information will be designated as invalid. The purpose of this delay was briefly described in connection with FIG. 2 (525), and will be further described below. Although not specifically illustrated in the drawing, the render node will then perform the swap of its back buffer, and then will signal the master computer (530) that the back buffer swap is complete. The master computer awaits this acknowledgement signal from all of the render nodes (540).

Once the master computer has received the acknowledgement from all render nodes, it then signals the render nodes (at substantially the same time using, for example, a multicast message) that they mark the current frame as valid. In response, each render node checks to see that the minimum capture time has been achieved, then embeds a validity code in the overscan area to denote the current frame as valid (550). As described above in connection with FIG. 2, each render node further sets a timer to provide and ensure a minimum time period during which the current frame of graphics information will be output and designated as valid. This minimum time ensures that the compositor will effectively receive the graphics data from each of the render nodes. Thereafter, the master computer proceeds by communicating the next frame of graphics data to the render nodes to be rendered into their respective back buffers.

As mentioned above, in one embodiment, after all render nodes have signaled the master than the rendering is complete, the master will send a swap command 522 to the nodes. Upon receiving the swap command, each node will insert an invalid (or freeze) code in the overscan line, and then wait a minimum time period before beginning the swap. A purpose for this delay is to ensure that all DVI outputs from the render nodes are in the invalid (or freeze) state before any node begins the swap (e.g., that the compositor sees all DVI inputs in the freeze state, before any render node begins the swap). Further, in one embodiment, the render nodes will coordinate the back buffer swap with the timing of the vertical retrace. The actual amount of this delay may vary from embodiment to embodiment, depending upon factors such as the amount of data being rendered, the resolution of the displays, etc. In one embodiment, a delay of six-tenths of a frame period was selected. It has been found that such a delay is sufficient to ensure all render node DVI outputs had entered the invalid (or freeze) state prior to beginning the swap, while also being short enough in duration to prevent noticeable stutter to result on the display. In this regard, if the delay is too long, the swap could require an excessive number of frames to take place, resulting in visible stutter to the user.

Similarly, after the master has signaled that all render nodes have completed the swap, the master signals all render nodes to proceed with the capture of the next frame. A similar delay (by the render nodes) is provided in response to this signal as well (the capture delay within 550). With regard to this delay, if too little delay is provided, "tearing" may be introduced, whereby the slave computers 120 might not all capture the same DVI frame. If, however, the delay is too long, then the frame rate may be undesirably slow. In one embodiment, a delay of eleven tenths of a frame period (e.g., just longer than a full frame period) was selected. Like the invalid (or freeze) delay of 525, the actual period of the delay of 550 may vary from embodiment to embodiment, depending on factors such as the amount of information to be rendered, display resolution, processing capabilities and speed of render node equipment, etc., and such timing issues will be appreciated by persons skilled in the art.

It should be appreciated that the flowchart illustrated in FIG. 6 provides only a top-level illustration of certain steps in an embodiment of the present invention.

Additional or alternative steps may be implemented in accordance with the scope and spirit of the embodiments described herein.

Figure 7:
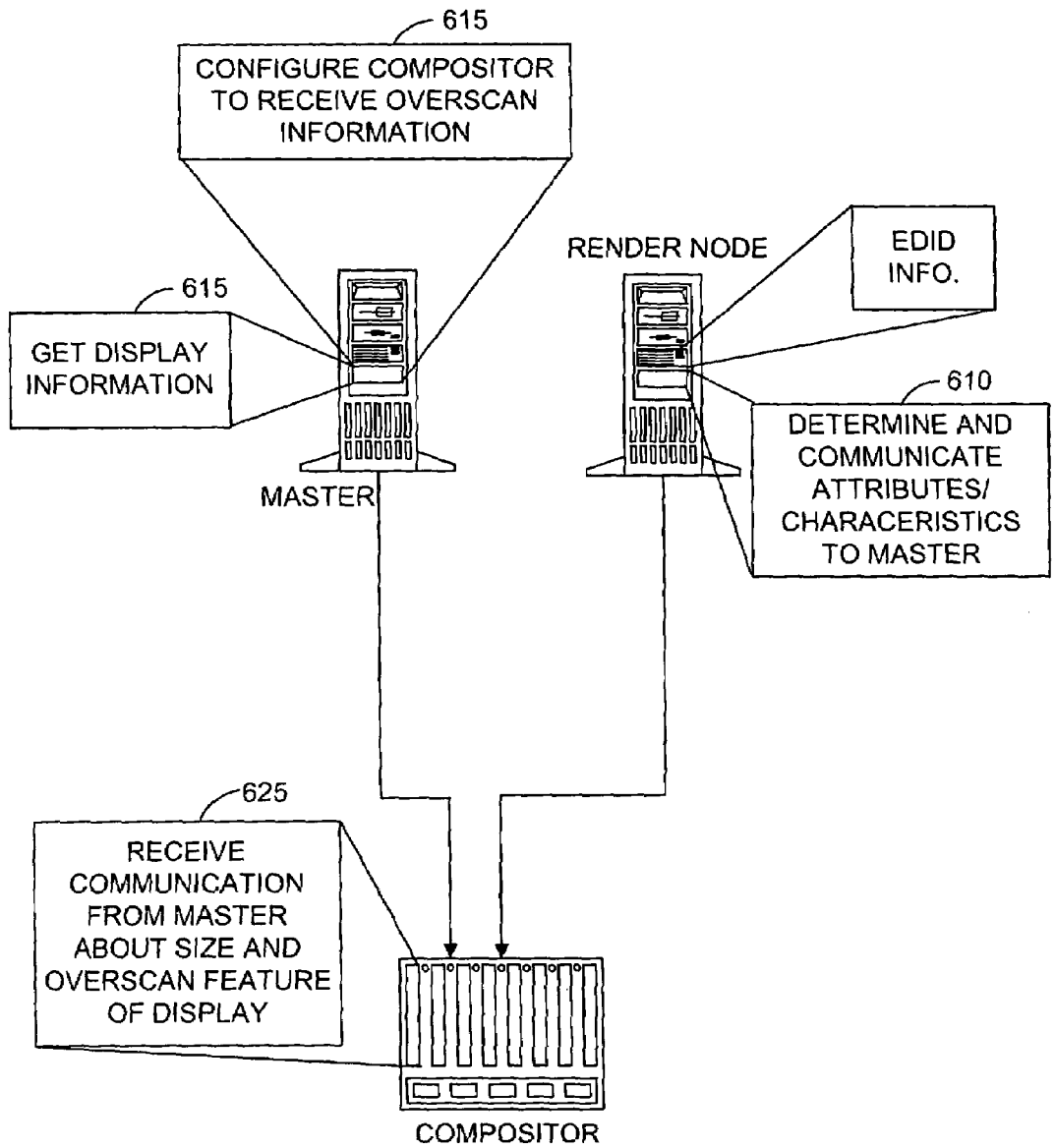
FIG. 7 is a diagram illustrating certain components of an embodiment of the present invention.

Reference is now made to FIG. 7, which is a diagram illustrating certain components that are provided in an embodiment of the present invention and utilized for configuring various components within a system to operate in accordance with certain embodiments described herein. The foregoing discussion has described certain features and aspects of embodiments, whereby render nodes embed certain information in an overscan area to facilitate efficient synchronization with a compositor. In this regard, the foregoing discussion has assumed the ability and configuration of system components with the operational aspects described. FIG. 7 illustrates a mechanism and methodology by which one embodiment is configured so as to provide information in an overscan area.

As is known, video monitors and display systems include EDID (Extended Display Identification Data) information, which defines various physical or operational aspects of a display, such as synchronization and timing information for the video signals. Mechanisms and methodologies are known whereby this information is communicated among the components of a system upon power up, so that the master and render nodes can compute timing and other aspects of the video signals for communicating to a compositor. Logic 610 is provided in conjunction with the graphics card of the render node to determine and communicate the certain information defining display attributes or characteristics to a master computer. Associated logic 615 is provided on the master computer to obtain this information from the render nodes. Assume, for example, that a render node is configured to provide a viewable display of 1024 scan lines and that the logic 610 confirms the ability of the associated display to display a larger number (at least one) of scan lines. This information is communicated to the logic 615 of the master computer. The master computer further includes logic 620 to communicate this information so as to configure the compositor. The compositor, in turn, includes logic to communicate with the master this configuration information. Thus, logic 620 in the master computer informs the logic 625 of the compositor that, for example, 1024 scan lines of viewable and graphics information will be communicated over the DVI (or other video interfaces) from the render nodes, but that an additional line of information will be communicated from those nodes. Stated another way, the logic 620 will communicate with logic 625 to configure the compositor for receiving 1025 scan lines of information over the video interfaces from the render nodes, and further informs the compositor that only 1024 of these scan lines will contain viewable graphics data. Once configured, this information is utilized by the interfaces (see FIG. 5) within a compositor for evaluating the overscan area of the graphics information provided over the videos inputs to the compositor. It will be appreciated by persons skilled in the art that, in the design process of such a system, it is determined that each of the slaves can be configured to 1025 (or another value), so that the master effectively expects the above-described process (e.g., that render node can properly configure overscan line(s)) to occur.

Figure 8:
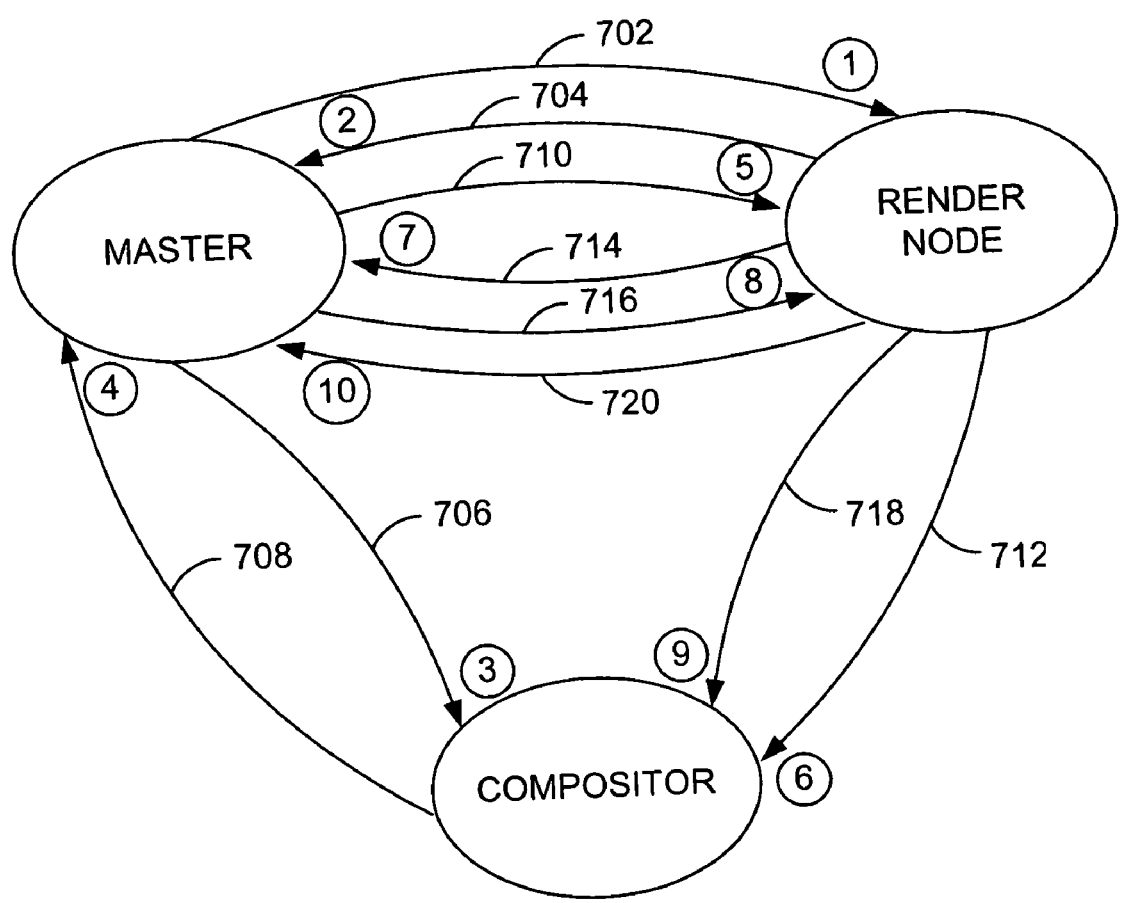
FIG. 8 is a diagram illustrating a transactional flow of information in an embodiment of the invention.

Reference is now made to FIG. 8, which is a transaction diagram illustrating the basic flow of transactions among the master, render, compositor nodes of a system constructed in accordance with an embodiment of the invention. In one embodiment, the master makes an initial configuration request of a render node 702 to ascertain the abilities of the display and graphics card of the render node 702. This information is provided from the render node back to the master (704). Once this information is obtained, the master communicates to the compositor 706 configuration information indicating the viewable size of the display, as well as any overscan lines that the compositor should expect to receive from the render nodes. Once configured, the compositor responds 708 back to the master indicating completion of the configuration (in other embodiments, that assume proper slave configurability, this communication back to the master may be omitted).

At this point, functional operation of the embodiments begins, and the master computer proceeds to provide graphics data to the render nodes for rendering. Thereafter, the master computer signals the render nodes 710 to perform a swap of their back or secondary frame buffers. In response, the render nodes signal 712 to the compositor that the current frame of graphics data is not valid (e.g., by embedding this information in an overscan area). The render nodes acknowledge to the master computer 714 once the back buffer has been swapped. Once receiving this acknowledgement from each of the render nodes, the master computer signals the render nodes 716 to designate their current output as valid. The render nodes, in response, signals 718 to the compositor that the associated frame of graphics information is valid (e.g., by embedding a valid code in the overscan area of the video signal interface). Each render node responds to the master 720 by confirming this action. Thereafter, aspects of this transaction flow may be repeated on a frame-by-frame basis.

Again, it will be appreciated that a variety of other embodiments may be implemented consistent with the scope and spirit of the present invention. For example, as described in connection with the embodiments herein, novel systems and methods are provided for synchronizing (within a compositor) the content from a plurality of individual video signals by providing certain signaling in an area of the data stream that is not viewable on the display. One such area is an overscan area (e.g., an additional scan line). This signaling information may take the form of validity codes (e.g., flags or data bits or bytes that indicate whether the content of the current or associated frame should be considered valid), or codes indicating the integrity of the current or associated frame content. This signaling information may be received and utilized by a compositor to provide effective synchronization among the plurality of video signals input to the compositor. In another embodiment, frame integrity information may be communicated to a compositor using a portion or segment of a video steam (via a DVI interface) that corresponds to a non-viewable or overscan area of a corresponding display.

What is claimed is:

1. A method performed by a compositor comprising:
   receiving a plurality of video signals to be combined to form a composite video signal for driving a display;
   for each of the plurality of received video signals:
   evaluating an overscan line of each of the plurality of video signals for frame integrity information, wherein a value of the frame integrity information indicates whether the received video signal contains a new frame of graphics information;

in response to detecting frame integrity information of a first value, maintaining the composite video signal to display a frame composited from previously captured video signals;

in response to detecting, in a later frame, frame integrity information of a second value, recognizing the later frame as containing valid video information and capturing that information; and after detecting frame integrity information of the second value in each of the plurality of video signals and capturing the respective frames of information, generating a composite video signal based on the newly captured frames.

2. The method of claim 1, wherein the evaluating an overscan line of each of the plurality of video signals for frame integrity information further comprises evaluating an invalidity code that is embedded in the overscan line.

3. In a system having a plurality of computers configured to collectively render three-dimensional graphics and a compositor configured to combine video signals output from the plurality of computers to generate a composite video signal to drive a single display, a method for swapping from a secondary frame buffer of one of the plurality of computers, the method comprising:

embedding a validity code having a first value in an overscan line of the video signal before beginning the swap, wherein a value of the validity code indicates whether the received video signal contains a new frame of graphics information;

embedding a validity code having a second value in the overscan line of the video signal after the swap is complete.

4. The method of claim 3, further comprising maintaining an output video signal by a compositor to drive the display that displays a video frame composited from captured video signals of a preceding frame, wherein the maintaining is performed in response to receiving a first validity code.

5. The method of claim 3, further comprising compositing a new output video signal by a compositor to drive the display that displays a video frame composited from a plurality of video signals, each of the plurality of video signals embodying content for a portion of a frame to be displayed on the display, each of the plurality of video signals containing the second validity code.

6. In a system having a plurality of computers configured to collectively render three-dimensional graphics and a compositor configured to combine video signals output from the plurality of computers to generate a signal to drive a single display, a method for synchronizing the plurality of video signals communicated from the plurality of computers with the compositor, the improvement comprising embedding information in an overscan line of each of the plurality of video signals, wherein a value of the information indicates whether the received video signal contains a new frame of graphics information, wherein the embedding further comprises inserting, by each of the plurality of computers, a first code in the overscan line of its output video signal, indicating that a new frame of information will be output shortly, further comprising recognizing, by the compositor, a change of the first codes to second codes as indicating a new frame of information currently being transmitted in the respective video signals.

7. An apparatus for generating a composite video signal from a plurality of independent video signals comprising:

a plurality of input interfaces for receiving the plurality of input video signals;

logic configured to evaluate information provided in an overscan line of the input video signal;

logic for storing a frame of video content in a first storage, for each individual video signal, based on the evaluated information associated with the frame of video, wherein a value of the information indicates whether the received video signal contains a new frame of graphics information;

second storage for storing a frame of composite video content;

logic for moving data from the first storage to the second storage, after a frame of video content has been stored in the first storage for each of the plurality of input video signals.

8. The apparatus of claim 7, further including first storage for temporarily storing video information received at each input interface.

9. The apparatus of claim 7, wherein each of the input video signals are communicated across a digital video input (DVI).

10. The apparatus of claim 7, further comprising logic configured to receive parameters that define a number of scan lines in a video frame, wherein the logic is configured to evaluate the information in the overscan line.

11. An apparatus for generating a composite video signal from a plurality of independent video signals comprising:

inputs for receiving the plurality of video signals;

logic configured to evaluate information provided in each of the plurality of video signals, the information being provided in a location of the video signals that is outside the viewable area corresponding to the video signals, wherein a value of the information indicates whether the received video signal contains a new frame of graphics information;

logic for compositing a video signal for a new frame in response to a detection of a changed value or state in the evaluated information for each of the plurality of video signals.

12. The apparatus of claim 11, wherein the location is in an overscan area of the video signals.

13. The apparatus of claim 11, further comprising storage for storing a frame of composite video content.

14. The apparatus of claim 13, further comprising temporary storage for temporarily storing video information received at each input interface.

15. The apparatus of claim 13, further comprising temporary storage for storing a frame of video content, in response to the evaluated information indicating a change from an invalid or unreliable previous frame to a valid current frame, the current frame being stored in the temporary storage.

16. The apparatus of claim 15, further comprising logic for moving data from the temporary storage to the storage, after a frame of video content has been stored in the temporary storage for each of the plurality of input video signals.

17. In a system having a plurality of computers configured to collectively render three-dimensional graphics and a compositor configured to combine video signals output from the plurality of computers to generate a composite video signal to drive a single display, a method for swapping from a secondary frame buffer of one of the plurality of computers, the method comprising:

receiving a command to perform a swap of contents of the secondary frame buffer;

embedding a validity code having a first value in an overscan line of the video signal, wherein a value of the validity code indicates whether the received video signal contains a new frame of graphics information;

waiting a first period of time before performing the swap;

performing the swap of the contents of the secondary frame buffer.

18. The method of claim 17, where the first period of time is substantially six-tenths of a frame period.

19. The method of claim 17, further comprising waiting a second period of time before embedding a validity code having a second value in the overscan line of the video signal.

20. The method of claim 19, where the second period of time is longer than the first period of time.

21. The method of claim 17, further comprising embedding a validity code having a second value in the overscan line of the video signal after the swap is complete.

22. The method of claim 17, where the second period of time is substantially eleven-tenths of a frame period.

* * * * *